US007014246B2

(12) United States Patent
Huedepohl

(10) Patent No.: US 7,014,246 B2
(45) Date of Patent: Mar. 21, 2006

(54) FOLDABLE TOPS FOR CONVERTIBLE VEHICLES

(75) Inventor: Stefan Huedepohl, Bissendorf (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 10/658,038

(22) Filed: Sep. 9, 2003

(65) Prior Publication Data

US 2004/0119315 A1 Jun. 24, 2004

(30) Foreign Application Priority Data

Sep. 11, 2002 (DE) ........................................ 102 42 044

(51) Int. Cl.
*B60J 7/00* (2006.01)

(52) U.S. Cl. ........................... 296/107.07; 296/107.18; 296/116; 296/117

(58) Field of Classification Search ............ 296/107.07, 296/116, 117, 146.14, 107.12, 107.18, 107.09
See application file for complete search history.

(56) References Cited

U.S. PATENT DOCUMENTS

| | | | | | |
|---|---|---|---|---|---|
| 2,578,990 | A | * | 12/1951 | Bessonneau | 296/116 |
| 2,729,502 | A | * | 1/1956 | Hale | 296/117 |
| 2,768,857 | A | * | 10/1956 | Albrecht | 296/117 |
| 3,385,629 | A | * | 5/1968 | Podolan | 296/146.14 |
| 4,693,509 | A | * | 9/1987 | Moy et al. | 296/107.07 |
| 4,784,428 | A | | 11/1988 | Moy et al. | |
| 5,335,959 | A | * | 8/1994 | Schrader et al. | 296/116 |
| 5,816,644 | A | * | 10/1998 | Rothe et al. | 296/107.18 |
| 6,270,143 | B1 | * | 8/2001 | Heselhaus et al. | 296/107.07 |
| 6,454,342 | B1 | * | 9/2002 | Heselhaus et al. | 296/107.07 |
| 6,485,085 | B1 | * | 11/2002 | Pecho et al. | 296/107.07 |
| 6,536,831 | B1 | * | 3/2003 | Rothe et al. | 296/107.07 |
| 6,578,898 | B1 | * | 6/2003 | Rothe et al. | 296/107.07 |
| 6,688,670 | B1 | * | 2/2004 | Biecker et al. | 296/107.18 |
| 6,793,267 | B1 | * | 9/2004 | Hesselhaus | 296/107.07 |
| 2002/0005653 | A1 | | 1/2002 | Heselhaus et al. | |
| 2002/0024230 | A1 | * | 2/2002 | Pfertner et al. | 296/107.07 |
| 2002/0030380 | A1 | | 3/2002 | Rothe et al. | |
| 2002/0074822 | A1 | | 6/2002 | Rothe et al. | |
| 2003/0146642 | A1 | * | 8/2003 | Mandl et al. | 296/107.09 |
| 2004/0066058 | A1 | * | 4/2004 | Frank | 296/117 |
| 2004/0119315 | A1 | * | 6/2004 | Huedepohl | 296/107.07 |

FOREIGN PATENT DOCUMENTS

| | | |
|---|---|---|
| EP | 0 332 812 A2 | 9/1989 |

* cited by examiner

*Primary Examiner*—Kiran Patel
(74) *Attorney, Agent, or Firm*—Michael Best & Friedrich LLP

(57) ABSTRACT

Foldable tops (1) suitable for convertible vehicles may include a rear window (3) supported within a roof covering (2). A tensioning bow (5) imparts a tension across a rear portion of the roof covering when the foldable top is disposed in a roof closed position. A lower edge (4) of the rear window (3) is supported along a supporting portion of the tensioning bow when the foldable top is disposed in the roof closed position. At least one connector (9) is preferably disposed along the supporting portion between the rear window and the tensioning bow. The at least one connector releaseably engages the lower edge of the rear window with the tensioning bow when the foldable top is disposed in the roof closed position and disengages the rear window from the tensioning bow when the foldable top is opened. The at least one connector preferably comprises a hook portion (10) and a complementary projection (11).

25 Claims, 3 Drawing Sheets

FOLDABLE TOPS FOR CONVERTIBLE VEHICLES

CROSS-REFERENCE

This application claims priority to German patent application no. 102 42 044.0, filed Sep. 11, 2002, the contents of which are hereby incorporated by reference as if fully set forth herein.

1. Technical Field

The present invention relates to convertible vehicles having folding tops, in which a rear window is supported within a roof covering and at least a portion of the rear window is detachably connectable to a tensioning bow.

2. Discussion of the Related Art

Commonly-owned German Patent Publication No. 100 29 478 A1 discloses a convertible vehicle having a folding top, in which a tensioning bow supports a lower edge of a rear window when the folding top is disposed in the roof closed position. The lower edge of the rear window separates from the tensioning bow when the folding top is opened and subsequently stowed in a folding top compartment.

Commonly-owned U.S. patent Publication Nos. 2002-5653 and 2002-74822 also disclose foldable tops having a rear window that detaches from the tensioning bow when the folding top is moved to the roof open position.

SUMMARY OF THE INVENTION

It is one object of the present teaching to provide improved foldable tops suitable for convertible vehicles and to methods for making and using the same.

One aspect of the present teachings is directed to improving the seal of a detachable rear window that rests on (is supported by) the tensioning bow in the roof closed position. In addition or in the alternative, reduction of the noise level within the vehicle interior when the roof is closed and improvements of the visual appearance of the rear portion of the convertible vehicle are also contemplated by further aspects of the present teachings.

In one embodiment of the present teachings, folding tops suitable for use in convertible vehicles may preferably include one or more connectors for releaseably coupling a rear window to a tensioning bow when the folding top is moved to and then disposed in the roof closed position. The connector(s) optionally may be disposed along a lower edge or lower area of the rear window, so that the lower edge or area of the rear window may be detachably connectable to the tensioning bow. The connector(s) optionally also may be incorporated within the tensioning bow, e.g., in a substantially middle portion of the tensioning bow. Further, the connector(s) is (are) preferably designed so as to automatically release (i.e., without manual assistance) when the foldable top is moved to a roof open position. Various constructions for the connecter(s) are possible so as to provide a releasable locking assembly according to the present teachings.

In another embodiment of the present teachings, the connector(s) preferably operate(s) as a window locking device. Optionally, the connector(s) may operate independently from a folding top kinematic linking assembly that effects the opening and closing of the foldable roof. Moreover, the folding top kinematic linking assembly may be controllable (moveable) by an electrical and/or mechanical drive device, such as a motor, or may be manually moved. One or more connecter elements may be disposed on the tensioning bow and/or the lower edge of the rear window so as to define a releasable lock that ensures improved sealing along the portion of the tensioning bow that supports the rear window in the roof closed position. Such a releasable lock design also provides the advantageous effect of improved noise reduction within the vehicle interior when the roof is closed. Further, by suitably disposing the connecter(s) in position(s) that minimize gap sizes between the rear window and the tensioning bow, the overall impression or visual appearance of the rear portion of the vehicle body can be improved.

In another embodiment, the connecter(s) may form additional guide, support and/or locking structures for the rear window. The final position of the connected elements is preferably adjustable independently from the folding top kinematic linking assembly. Further, individual tolerance dimensions and combined tolerances in the area between the rear window and the tensioning bow, which are necessary for the structures of the folding top kinematic linking assembly, can be minimized by providing the guide, support and/or locking structures. In addition to improving the visual appearance of the vehicle by reducing gap sizes, the parallelism of the rear window with respect to the tensioning bow can be adjusted more precisely due to the locking of the rear window. Therefore, a sealing system may be defined between these structures in order to impart a uniform pressure on the sealing material when the foldable top is disposed in the roof closed position, which will assist in ensuring long-term functionality.

In another embodiment, the connecter(s) may be designed so as to attenuate vibrations emanating from the lower portion of the rear window when the vehicle is moving, which vibrations would ordinarily be transmitted via the vehicle body. Therefore, the connector(s) may serve to improve the acoustic characteristics of the foldable top, as well as the acoustics of the vehicle interior as a whole. Further, the connecter(s) optionally may detachably affix the rear window as a whole to the tensioning bow more tightly between roof covering and tensioning bow. In this case, a lesser amount of window vibrations will be generated and/or transmitted by this assembly. Moreover, when the foldable top is disposed in the roof closed position, the rear portion of the folding top will be more firmly supported (braced) for exposure to high driving loads (e.g., stress and strain on the folding top caused by driving the vehicle) due to the firm engagement between the rear window and the tensioning bow provided by the connector(s).

Additional objects, features and advantages of the present teachings will be readily understood to a person of ordinary skill in the art after reading the following detailed description of examples and embodiments of the present teachings together with the claims and the accompanying drawings.

DETAILED DESCRIPTION OF THE INVENTION

Figure 1:
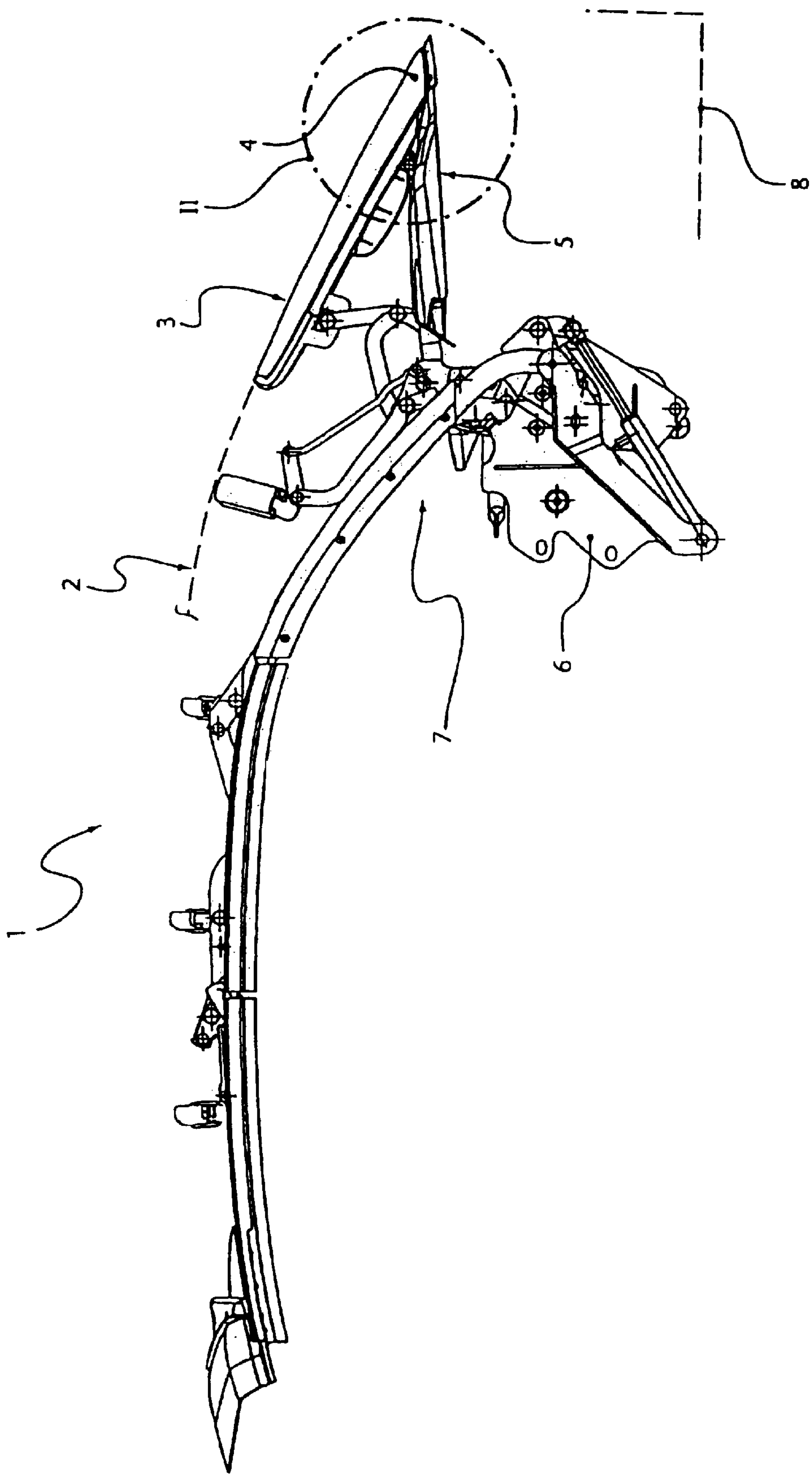
FIG. 1 shows a principal representation of a representative folding top frame having a folding top supporting a rear window that rests on a tensioning bow in a roof closed position.

In one embodiment of the present teaching, foldable tops suitable for convertible vehicles may include a rear window supported within a roof covering. Further, a tensioning bow may be arranged and constructed to impart a tension across a rear portion of the roof covering when the foldable top is disposed in a roof closed position. A lower edge of the rear window may be arranged and constructed to be detachably supported along a supporting portion of the tensioning bow when the foldable top is disposed in the roof closed position.

At least one connector (releasable lock) may be disposed on or along the supporting portion between the rear window and the tensioning bow. The at least one connector is preferably arranged and constructed to releaseably engage (lock) the lower edge of the rear window with the tensioning bow when the foldable top is disposed in the roof closed position and to disengage (unlock) the rear window from the tensioning bow when the foldable top is opened.

In another embodiment, the at least one connector may define an interlocking engagement. In addition or in the alternative, the at least one connector may define a frictional engagement.

A folding top kinematic linking assembly preferably supports the roof covering and may be arranged and constructed to effect opening and closing of the foldable top and to control movement of the rear window relative to the tensioning bow during the opening and closing of the foldable top. In this case, the at least one connector may be arranged and constructed to be engaged and disengaged (locked and unlocked) when the folding top kinematic linkage assembly respectively closes and opens the foldable top. Optionally, the foldable top kinematic linking assembly may be arranged and constructed such that a lifting, pivoting and/or pushing movement is defined between the rear window and the tensioning bow during the opening and closing of the foldable top, which movement respectively disengages and engages the at least one connector.

In another embodiment, the at least one connector may be arranged and constructed to disengage when the rear window moves in an opposite direction with respect to the tensioning bow. In addition or in the alternative, a plurality of discrete (separate) connectors may be disposed along the supporting portion of the tensioning bow.

In another embodiment, the at least one connector (releasable lock) may include a hook portion and a complementary projection defined adjacent to a recess. The hook portion and complementary projection may be respectively defined so as to be engageable (lockable) when the folding top is moved from a roof open position to a roof closed position and to be disengageable (unlockable) when the folding top is moved from the roof closed position to the roof open position. Optionally, the hook portion may be coupled to the rear window and the complementary projection may be coupled to the tensioning bow.

In another embodiment, a molding may be defined along a lower edge of the rear window. The molding preferably integrally defines or provides the hook portion, although the hook portion also may be provided separately from the molding. Further, the molding may include several layers and an integrated reinforcement part may be disposed within the molding adjacent to the hook portion. In addition or in the alternative, the molding may extend from an inner side of the rear window to a corner area of the rear window. Optionally, a lip profile may be defined along an exterior surface of the molding and may extend along substantially the same level as the lower edge of the rear window.

In further optional embodiments, the molding may comprise a synthetic resin material disposed on the lower edge of the rear window and the hook portion may be substantially wedge-shaped. The molding also may be a single, continuous member affixed to the rear window.

In another embodiment, a sealing profile member may extend along an inner side of the rear window adjacent to the molding. The sealing profile member may be substantially elongated and preferably covers at least a portion of the molding to the rear window.

In another embodiment, the projection preferably comprises an extension forming a groove/notch-shaped recess attached to the tensioning bow. In addition or in the alternative, the hook portion may be shaped as a profile part in a single, continuous member extending along a molding defined along the lower edge of the rear window. In addition, the hook portion may detachably engage the complementary projection, which preferably extends along the length of the supporting portion of the tensioning bow.

In another embodiment of the present teachings, first means may be provided for moving a foldable top from a roof closed position to a roof open position and vice versa. Representative first means include a foldable frame, or folding top kinematic linking assembly, which is arranged and constructed to fold the foldable top. Such frames and linking assemblies are generally well known in the art and a wide variety of designs may be advantageously utilized together with the present teachings. In addition, second means may be provided for automatically unlocking a lower edge of a rear window supported within the foldable top from a tensioning bow disposed within the foldable top while the foldable top is being moved from the roof closed position to the roof open position. Preferably, the lower edge of the rear window is releaseably interlocked with the tensioning bow when the foldable top is disposed in the roof closed position. In one representative embodiment, the second means preferably defines a releasable connector. The second means also may automatically lock (interlock) the lower edge of the rear window with the tensioning bow while the foldable top is being moved from the roof open position to the roof closed position.

In another embodiment of the present teachings, a method may include moving a foldable top from a roof closed position to a roof open position and vice versa. The method may also include automatically unlocking a lower edge of a rear window supported within the foldable top from a tensioning bow disposed within the foldable top while the foldable top is being moved from the roof closed position to the roof open position. The method also may include automatically locking (interlocking) the lower edge of the rear window with the tensioning bow while the foldable top is being moved from the roof open position to the roof closed position.

Each of the additional features and teachings disclosed below may be utilized separately or in conjunction with other features and teachings to provide improved folding roof tops and convertible vehicles and methods for designing and using such foldable tops and vehicles. Representative examples of the present invention, which examples utilize many of these additional features and teachings both separately and in conjunction, will now be described in further detail with reference to the attached drawings. This detailed description is merely intended to teach a person of skill in the art further details for practicing preferred aspects of the present teachings and is not intended to limit the scope of the invention. Moreover, combinations of features and steps disclosed in the following detail description may not be necessary to practice the invention in the broadest sense, and are instead taught merely to particularly describe representative examples of the invention. Further, various features of the representative examples and the dependent claims may be combined in ways that are not specifically and explicitly enumerated in order to provide additional useful embodiments of the present teachings. All features disclosed in the description and/or the claims are intended to be disclosed separately and independently from each other for the purpose of original written disclosure, as well as for the purpose of restricting the claimed subject matter independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

FIG. 1 shows a representative folding top 1, which is arranged and constructed to be pivotably (foldably) mounted on a convertible vehicle (not shown for the purpose of clarity). The folding top 1 is preferably constructed in a mirror image with respect to the longitudinal middle plane of the vehicle. The folding top 1 includes a roof covering (skin) 2, which is indicated by a broken line in FIG. 1 for the sake of clarity. The roof covering 2 may preferably comprise a flexible covering, such as a fabric or textile material, and/or may include rigid portions.

A rear window 3 is supported within a rear portion of the roof covering 2. The rear window 3 is preferably a rigid member, such as a solid glass pane. Further, a frame (not shown) may be provided around at least three edges (e.g., side and upper edges) of the rear window 3. More preferably, the rear window 3 is permanently or fixedly connected to the roof covering 2 only along its two longitudinal side edges and along its upper edge. For example, the rear covering 2 may be attached to the frame, which is disposed around the rear window 3, or the roof covering 2 may be attached directly to the rear window 3.

According to the representative embodiment, the rear window 3 may be sized so as to extend substantially to a tensioning bow (clamping collar) 5 when the foldable top 1 is disposed in the roof closed position. In other words, as discussed further below, a lower edge 4 of the rear window 3 may be detachably (releaseably) connectable to the tensioning bow 5. Such a rear window design provides a substantially unobstructed rear view all the way down to the window shoulder line (upper edge) of the vehicle. The window shoulder line may be defined, in part, by a substantially horizontally-extending rear trunk lid in many convertible vehicle designs.

Figure 2:
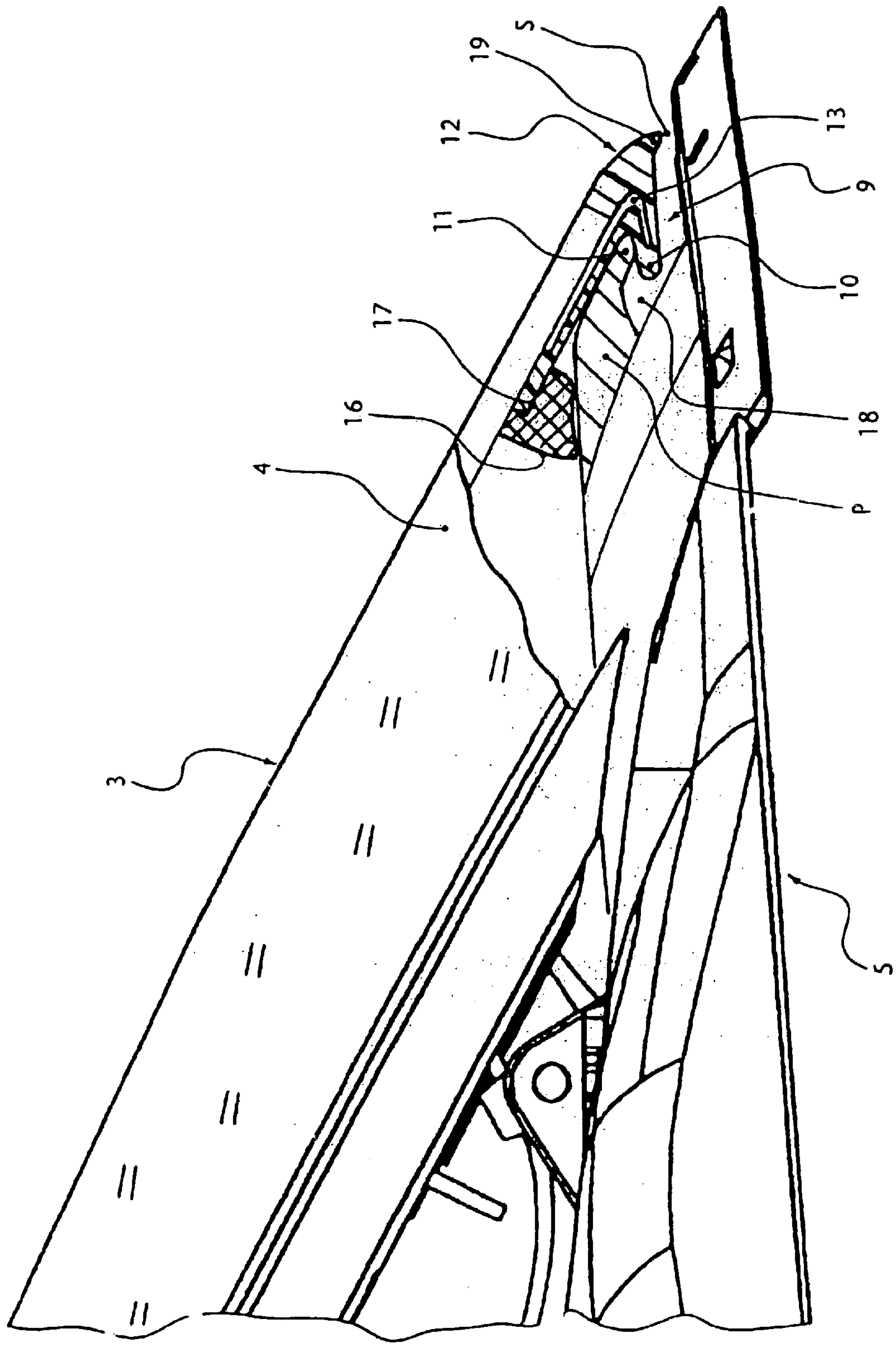
FIG. 2 shows an enlarged detail of the rear window contact area II shown in FIG. 1, when the foldable top is disposed in the roof closed position.

When the folding top 1 is disposed in the roof closed position as shown in FIGS. 1 and 2, the lower edge 4 of the rear window 3 may rest on, or may be supported by, the tensioning bow 5. In addition, the tensioning bow 5 may preferably be moved or pivoted by a foldable top kinematic linkage assembly (foldable frame) 7, which is pivotably supported on the vehicle body by a folding top main bearing (mounting) 6. Naturally, the folding top main bearing 6 is preferably arranged and constructed so as to be mounted on (coupled to) the convertible vehicle body.

The tensioning bow 5 preferably includes suitable guiding and tensioning parts, as is well known in the art, such as from German Patent Publication No. 100 29 478 A1 and U.S. patent Publication Nos. 2002-5653 and 2002-74822, all of which are incorporated herein by reference as if fully set forth herein.

The folding top kinematic linkage assembly 7 is preferably constructed so that, when the tensioning bow 5 is moved or pivoted during the roof opening operation of the folding top 1, at least a lower portion (or lower edge 4) of the rear window 3 is freed (detached) from the tensioning bow 5. Such a design enables the entire, or substantially the entire, foldable top 1 to be efficiently stored within a folding top storage compartment 8 (depicted by dotted lines in FIG. 1) defined within the vehicle body. The folding top storage compartment 8 may be provided between the vehicle interior and the vehicle trunk space and may be designed so as to receive all, or only a portion, of the folding top 1 when the folding top 1 is stowed in the roof open position. The folding top kinematic linkage assembly 7 preferably provides a suitable tension connection or coupling between the tensioning bow 5 and the rear window 3.

Figure 3:
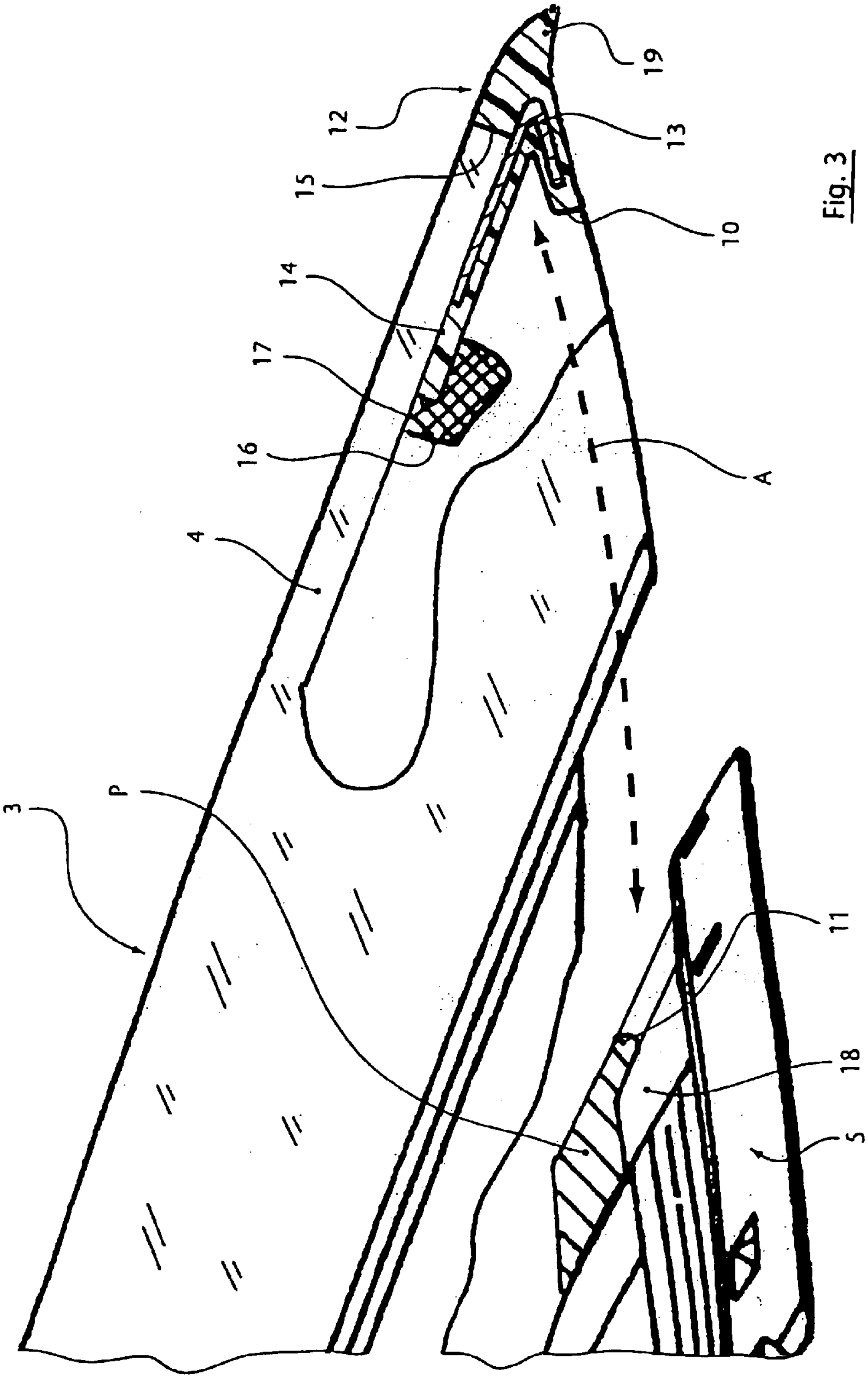
FIG. 3 shows a view similar to FIG. 2, but in which the rear window is disposed in an initial phase of a roof opening operation while the tensioning bow is being lifted.

FIGS. 2 and 3 show in greater detail the area II outlined by a dotted line in FIG. 1, which is focused on the contact area defined between the rear window 3 and the tensioning bow 5. In particular, at least one connecter 9 is preferably defined or disposed between the rear window 3 and the tensioning bow 5. The at least one connector 9 preferably serves as a releasable connecting (locking) component for securing the rear window 3 to the tensioning bow 5 when the foldable top 1 is disposed in the roof closed position. Moreover, the at least one connector 9 is also preferably designed so as to free or release the rear window 3 from the tensioning bow 5 when the folding top 1 is moved (pivoted or folded) in order to be stored within the folding top storage compartment 8. By enabling at least the lower edge 4 of the rear window 3 to separate or detach from the tensioning bow 5 before stowing the foldable top 1 in the foldable top storage compartment 8, the rear window 3 can be stored more efficiently (e.g., more compactly).

The connecter 9 may be designed according to a variety of possible constructions and the present teachings are not particularly limited in this regard. The connector 9 preferably defines an interlocking (form-fitting) and/or frictional engagement between the rear window 3 and the tensioning bow 5. In such case, independent of the supporting pressure imparted by the folding top kinematic linking assembly 7, an additional direct connection between the rear window 3 and the tensioning bow 5 is achieved.

In the representative embodiment, the connecter 9 is preferably constructed in such a manner that the connecter 9 is affixed or engaged or locked in the connected position and can be released or detached or unlocked from the connected position by the movement of the folding top kinematic linkage assembly 7, which movement causes the rear window 3 to move relative to the tensioning bow 5 when the folding top 1 is opened. Moreover, suitable connectors according to the present teachings optionally may also include separate actuation members (not shown).

Viewing FIGS. 2 and 3 together, during the respective opening and closing movement of the folding top 1, which opening and closing movement is realized by the folding top kinematic linking assembly 7 in conjunction with the main bearing 6, the rear window 3 moves relative to the tensioning bow 5 along an arched or curved path A (FIG. 3), which movement path generally includes lifting, pivoting and/or pushing components. This relative movement between the rear window 3 and the tensioning bow 5 is preferably utilized to respectively disengage or engage the connection established by the connector 9 between the rear window 3 and the tensioning bow 5. In addition, the connector 9 may be engaged or disengaged, respectively, by simultaneously pivoting or moving the rear window 3 and the tensioning bow 5 in opposite directions relative to each other.

The rear window 3 may generally extend over (above) a supporting area defined by the tensioning bow 5. In other words, the supporting area may be defined substantially vertically of the tensioning bow 5. Furthermore, two or more connectors 9 may be provided along a slightly arched or curved contour or path defined between the rear window 3 and the tensioning bow 5 (e.g., when the rear window 3 and the tensioning bow 5 includes an arched or curved cross-section). Although not shown in detail, a plurality of connectors 9 according to the present teachings may be disposed in parallel and/or in rows extending along the lengthwise (axial) direction of the tensioning bow 5.

As shown in FIGS. 2 and 3, each connector 9 may preferably include two complementary locking elements, e.g., a hook portion 10 and a complementary projection 11. Naturally, the hook portion 10 is preferably designed so as to releaseably engage the projection 11. Further, the hook portion 10 and the projection 11 may be shifted or moved relative to each other according to the upwardly curved path A shown in FIG. 3 when the rear window 3 is separated from and is moved towards the tensioning bow 5. As noted above, the folding top kinematic linking assembly 7 is preferably arranged and constructed so as to effect the relative movement of the rear window 3 and the tensioning bow 5 during the roof opening and closing operations.

Although not shown in detail, the hook portion 10 may move, at least in part, in the vertical direction relative to the projection 11. In this case, the respective installation positions of the hook portion 10 and a complementary projection 11 should be adjusted accordingly.

FIG. 3 shows the respective locking elements (i.e., the hook portion 10 and the projection 11) of the connector 9 being disengaged from each other. Preferably, a shaped molding 12 is disposed along the lower edge 4 of the rear window 3. In this case, the hook portion 10 optionally may be incorporated into the molding 12. In other words, the hooked portion 10 and the molding 12 may form a single, continuous member. Further, opposite to the molding 12, the projection 11 may be integrally formed with the tensioning bow 5 via an elongated profile P.

The molding 12 may be formed, e.g., in several layers. For example, a reinforcement part 13 may stabilize the substantially wedge-shaped connecting profile and may be integrated within the molding 12 along the hook portion 10. The reinforcement part 13 may comprise, e.g., a molded (profiled) and/or bevelled metal band.

The molding 12 may extend from an inner side 14 of the rear window 3 to a corner area 15. The exterior edge of the molding 12 may define a lip profile 19 that laterally extends continuously along the lower exterior of the rear window 3. The lip profile 19 may be designed to close (or cover), or substantially close (or substantially cover), a gap S defined between the lower edge 4 of the rear window 3 and the exterior surface of the tensioning bow 5 when the foldable top 1 is disposed in the roof closed position.

The molding 12 may comprise a synthetic material that is disposed on the rear window 3, e.g., by injection molding, extrusion molding, etc. The synthetic material is preferably formed so as to incorporate one or more wedge-shaped hook portions 10 along the lower edge 4 of the rear window 3. Optionally, the molding 12 may be made as a single, integral (continuous) part that is affixed to the rear window 3 by adhesive, a clamp or other mechanical fastening means (not shown).

A sealing profile member 16 may preferably extend along the inner side 14 of the rear window 3 adjacent to (and at least partially overlapping) the molding 12 so as to ensure that the molding 12 is reliably affixed to the rear window 3. The sealing profile member 16 may be constituted as an elongated element that extends substantially in parallel with the molding 12. In this case, the sealing profile member 16 and the molding 12 may also include a covering portion 17 that is also coupled to the molding 12.

A recess 18 may be defined within the elongated profile P adjacent to the projection 11. The elongated profile P may be coupled directly or indirectly to the tensioning bow 5. As noted above, the hook portion 10 is preferably designed so as to be inserted into the recess 18 in order to engage the projection 11, as shown in FIG. 2. In addition or in the alternative, the projection 11 may be replaced with an extension (not shown) that forms a groove/notch-shaped recess 18 attached to the tensioning bow 5.

As noted above, the hook portion 10 may be shaped as a profile part in one continuous piece that extends along a longitudinal direction of the molding 12. In the alternative, two or more discrete (separate) hook portions 10 (and corresponding complementary projections 11) may be provided. Each hook portion 10 preferably releaseably engages the corresponding complimentarily-shaped projection 11. Further, the one or more projections 10 preferably extend(s) from the tensioning bow 5 along the length of the rear window supporting area in such a manner that, instead of the shown hook portion-projection connection(s) 10, 11, a releasable interlocking connection is provided across the entire rear window supporting area according to the outer contour (peripheral edge) of the rear window 3 (e.g., along the edge of the lower portion 4 of the rear window 3).

The closed position of the rear window 3 on the tensioning bow 5, as shown in FIG. 2, provides optimal cooperation of the connectors 9 with the sealing profile member 16. Thus, the rear portion of the vehicle achieves improved sealing, reduced noise in the vehicle interior (cabin) and an improved visual impression or appearance due to the relatively small gap size S between the molding 12 and the tensioning bow 5.

Naturally, the foldable roofs described herein may be manually opened and closed, or may be automatically driven, e.g., electronically and/or hydraulically.

What is claimed is:

1. A foldable top suitable for a convertible vehicle, comprising:

a rear window supported within a roof covering, a tensioning bow arranged and constructed to impart a tension across a rear portion of the roof covering when the foldable top is disposed in a roof closed position, wherein a lower edge of the rear window is arranged and constructed to be supported along a supporting portion of the tensioning bow when the foldable top is disposed in the roof closed position, at least one connector disposed on the supporting portion between the rear window and the tensioning bow, the at least one connector being arranged and constructed to releaseably engage the lower edge of the rear window with the tensioning bow when the foldable top is disposed in the roof closed position and to disengage the rear window from the tensioning bow when the foldable top is opened.

2. The foldable top according to claim 1, wherein the at least one connector defines an interlocking engagement.

3. The foldable top according to claim 1, wherein the at least one connector defines a frictional engagement.

4. The foldable top according to claim 1, further comprising a folding top kinematic linking assembly supporting the roof covering and being arranged and constructed to effect opening and closing of the foldable top and to control movement of the rear window relative to the tensioning bow during the opening and closing of the foldable top, wherein the at least one connector is arranged and constructed to be engaged and disengaged when the folding top kinematic linkage assembly respectively closes and opens the foldable top.

5. The foldable top according to claim 4, wherein the foldable top kinematic linking assembly is arranged and constructed such that a lifting, pivoting and/or pushing movement is defined between the rear window and the tensioning bow during the opening and closing of the foldable top, which movement respectively disengages and engages the connector.

6. The foldable top according to claim 1, wherein the at least one connector is arranged and constructed to disengage when the rear window moves in an opposite direction with respect to the tensioning bow.

7. The foldable top according to claim 1, wherein a plurality of discrete connectors is disposed along the supporting portion of the tensioning bow.

8. The foldable top according to claim 1, wherein the at least one connector comprises a hook portion and a complementary projection defined adjacent to a recess, the hook portion and complementary projection being respectively defined so as to be engageable when the folding top is moved from a roof open position to a roof closed position and to be disengageable when the folding top is moved from the roof closed position to the roof open position.

9. The foldable top as in claim 8, wherein the hook portion is coupled to the rear window and the complementary projection is coupled to the tensioning bow.

10. The foldable top according to claim 8, further comprising a molding defined along a lower edge of the rear window, wherein the molding integrally defines the hook portion.

11. The foldable top according to claim 10, wherein the molding comprises several layers and includes an integrated reinforcement part disposed adjacent to the hook portion.

12. The foldable top according to claim 10, wherein the molding extends from an inner side of the rear window to a corner area of the rear window, and wherein a lip profile is defined along an exterior surface of the molding and extends along substantially the same level as the lower edge of the rear window.

13. The foldable top according to claim 10, wherein the molding comprises a synthetic resin material disposed on the lower edge of the rear window and the hook portion is substantially wedge-shaped.

14. The foldable top according to claim 10, wherein the molding is a single, continuous member affixed to the rear window.

15. The foldable top according to claim 10, further comprising a sealing profile member extending along an inner side of the rear window adjacent to the molding.

16. The foldable top according to claim 15, wherein the sealing profile member is elongated and covers at least a portion of the molding to the rear window.

17. The foldable top according to claim 8, wherein the projection comprises an extension forming a groove/notch-shaped recess attached to the tensioning bow.

18. The foldable top according to claim 8, wherein the hook portion is shaped as a profile part in a single, continuous member extending along a molding defined along the lower edge of the rear window, the hook portion being arranged and constructed to detachably engage the complimentarily projection, which extends along the length of the supporting portion of the tensioning bow.

19. The foldable top according to claim 1, further comprising:

a folding top kinematic linking assembly supporting the roof covering and being arranged and constructed to effect opening and closing of the foldable top and to control movement of the rear window relative to the tensioning bow during the opening and closing of the foldable top, wherein the foldable top kinematic linking assembly is arranged and constructed such that a lifting, pivoting and/or pushing movement is defined between the rear window and the tensioning bow during the opening and closing of the foldable top, which movement respectively disengages and engages the connector, a molding defined along the lower edge of the rear window and comprising several layers, wherein a reinforcement part is integrated within the molding and a lip profile is defined along an exterior surface of the molding, and wherein the connector defines an interlocking, frictional engagement and comprises a hook portion and a complementary projection defined adjacent to a recess, the hook portion and complementary projection being defined so as to be engageable when the folding top is moved from a roof open position to a roof closed position and to be disengageable when the folding top is moved from the roof closed position to the roof open position, wherein the molding defines the hook portion and the molding and the hook portion define a single, continuous member affixed to the rear window.

20. The foldable top as in claim 19, wherein the hook portion is fixedly coupled to the rear window and the complementary projection is fixedly coupled to the tensioning bow.

21. An apparatus comprising:

first means for moving a foldable top between a roof closed position and a roof open position, and second means for automatically unlocking a lower edge of a rear window supported within the foldable top from a tensioning bow disposed within the foldable top while the foldable top is being moved from the roof closed position to the roof open position.

22. The apparatus according to claim 21, wherein the second means comprises at least one connector disposed between the lower edge of the rear window and the tensioning bow, the at least one connector being arranged and constructed to releasably engage the lower edge of the rear window with the tensioning bow when the foldable top is disposed in the roof closed position and to disengage the rear window from the tensioning bow when the foldable top is opened.

23. The apparatus according to claim 21, wherein the second means is further arranged and constructed to automatically lock the lower edge of the rear window to the tensioning bow while the foldable top is being moved from the roof open position to the roof closed position.

24. A method comprising:

moving a foldable top from a roof closed position to a roof open position, and automatically unlocking a lower edge of a rear window supported within the foldable top from a tensioning bow disposed within the foldable top while the foldable top is being moved form the roof closed position to the roof open position.

25. The method according to claim 24, further comprising:

moving the foldable top from the roof open position to the roof closed position, and automatically locking the lower edge of the rear window to the tensioning bow while the foldable top is being moved from the roof open position to the roof closed position, wherein the automatically unlocking step comprises unlocking at least one connector disposed between the lower edge of the rear window and the tensioning bow, wherein the lower edge of the rear window is disengaged from the tensioning bow, and the automatically locking step comprises locking the at least one connector, wherein the lower edge of the rear window is engaged with the tensioning bow.

* * * * *